Figure 1:
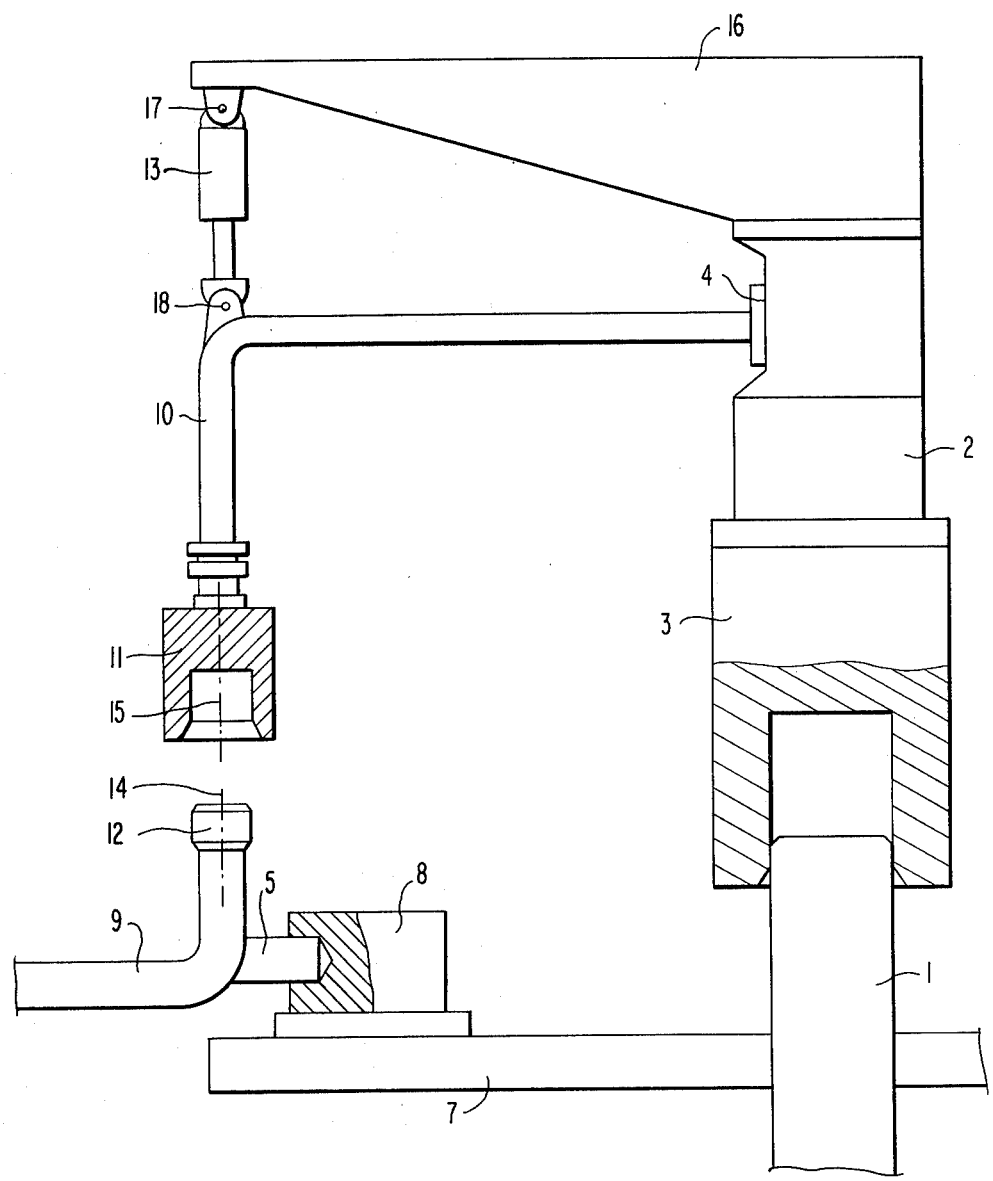

United States Patent [19]

Thominet

[11] 4,274,664
[45] Jun. 23, 1981

[54] PIPE JOINING DEVICE FOR UNDERSEAS PETROLEUM PIPELINE

[75] Inventor: Georges M. Thominet, Toulon, France

[73] Assignee: Compagnie Francaise des Petroles, Paris, France

[21] Appl. No.: 930,836

[22] Filed: Aug. 3, 1978

[30] Foreign Application Priority Data

Aug. 5, 1977 [FR] France .................. 77 24269

[51] Int. Cl.³ .............................. F16L 35/00
[52] U.S. Cl. ............................ 285/24; 285/DIG. 21; 166/346
[58] Field of Search ............ 285/18, 24, 27, DIG. 21; 166/346, 347; 137/615; 141/387, 388, 279, 284

[56] References Cited

U.S. PATENT DOCUMENTS

| 3,126,913 | 3/1964 | Green et al. | 137/615 |
| 3,604,730 | 9/1971 | Caroll et al. | 285/27 |
| 3,605,824 | 9/1971 | Madden et al. | 137/615 X |
| 3,710,859 | 1/1973 | Hanes | 166/346 |
| 3,718,183 | 2/1973 | Scott | 166/346 |
| 3,722,585 | 3/1973 | Nelson et al. | 166/346 |
| 3,899,199 | 8/1975 | Garey | 285/27 |
| 4,036,295 | 7/1977 | Kirkland et al. | 285/24 X |

Primary Examiner—Dave W. Arola
Attorney, Agent, or Firm—Sughrue, Rothwell, Mion, Zinn and Macpeak

[57] ABSTRACT

The invention relates to an automatic device for coupling pipe means having means to bring together and align the axes of the pipe means to be coupled.

A stiffener 46 supports one end of a helical and semi-rigid coupling tube 20, at points 47, 48 spaced along which are articulated respectively the rod 51 of a jack 50 and the base of the jack. At the end of travel relative movement toward one another of manifold 52 and well head 1, the axes of the end 12 of fixed collector 19 and of the end 11 of pipe 20 come into alignment under the deformation of pipe 20.

The device is applicable to pipe means with their axes vertical or horizontal and is particularly suited to the coupling collectors to well head manifolds in underwater petroleum wells.

6 Claims, 5 Drawing Figures

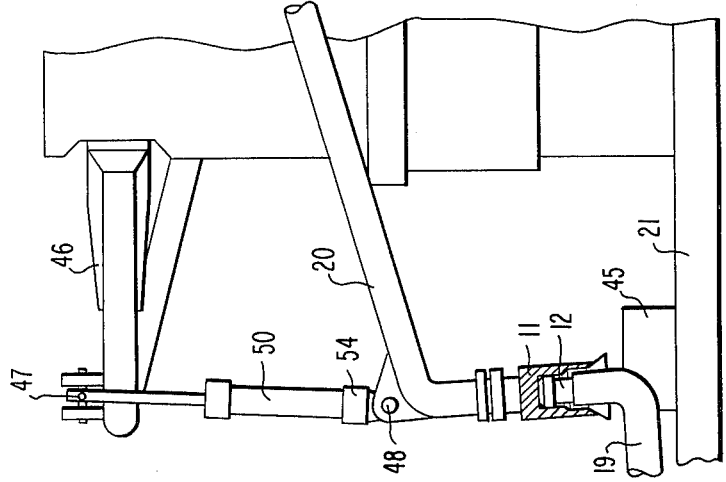
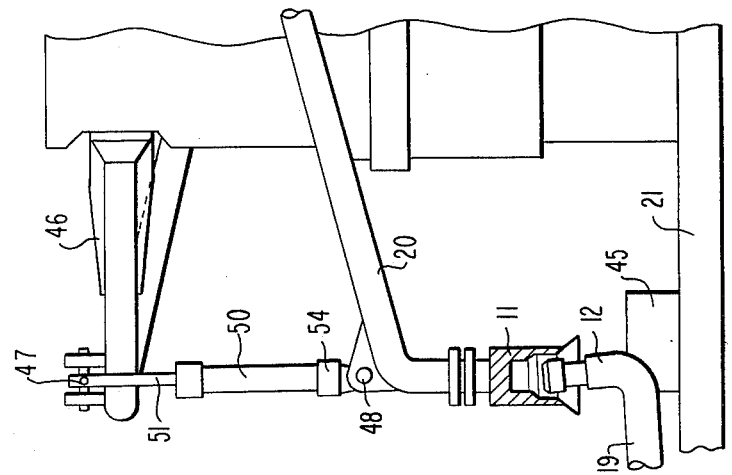
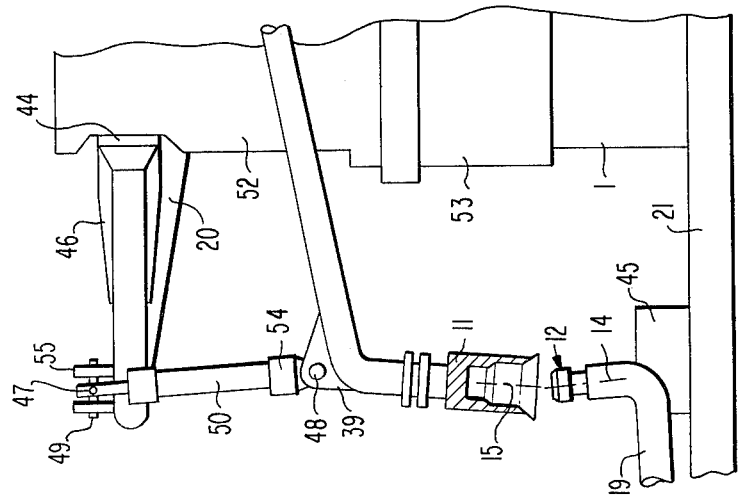

PIPE JOINING DEVICE FOR UNDERSEAS PETROLEUM PIPELINE

The invention relates to an automatic pipe coupling and more particularly an automatic pipe coupling for use where the pipe ends to be coupled are out of alignment.

Couplings of this type are required particularly for submarine oil well installations.

When a submarine well has been drilled, it is sometimes necessary to lay a discharge collector for the purpose of conveying the effluents of the well to the desired installation for treatment and storage. The end of such a collector must be connected to the valve manifold controlling the well, which manifold is coupled to the well head.

Despite taking precautions, there may be nonalignment of the axes of the members to be coupled.

According to the present invention there is provided a coupling for connecting a first pipe means fast with a first structure to a second pipe means fast with a second structure, the coupling comprising means to move the structures relatively toward and away from one another, a coupling pipe secured to the first structure and the end remote from the first structure being displaceable, support means for the coupling pipe in the region adjacent said first structure, a first end part carried by the end of the coupling pipe remote from the first structure, a second end part carried by the second pipe means, the end parts being male and female members engageable together to make a connection and having cooperating surfaces which will cooperate to guide the end parts if misaligned when offered to one another into alignment as they engage, relative movement of the structures toward one another bringing the end parts to a first relationship and means being provided to complete the engagement of the first end part and the second end part.

The means to complete the engagement of the end parts may be the means for effecting relative movement of the structures toward one another which means are operable in completing that movement to complete the engagement of the end parts, any misalignment being accommodated by displacement of the pipe.

The connecting pipe may be formed to a helix to give a degree of displaceability to accommodate likely degrees of misalignment of the end parts.

The pipe may be provided with a stiffener in the form of a jack to achieve the desired displaceability.

To complete the engagement the end parts separately form completion of the relative movement of the structures toward one another. A jack may be provided to positively displace the connecting pipe and thereby engage the end parts after the relative movement of the structures toward one another is complete.

It is thus possible easily to control the action of the jack and ensure perfect coupling of the connector. This control is more especially important because the operations of connecting the valve manifold and of coupling to the collector are carried out at great depths and without the customary devices for guiding by means of cables or by means of re-entry columns.

Figure 5:
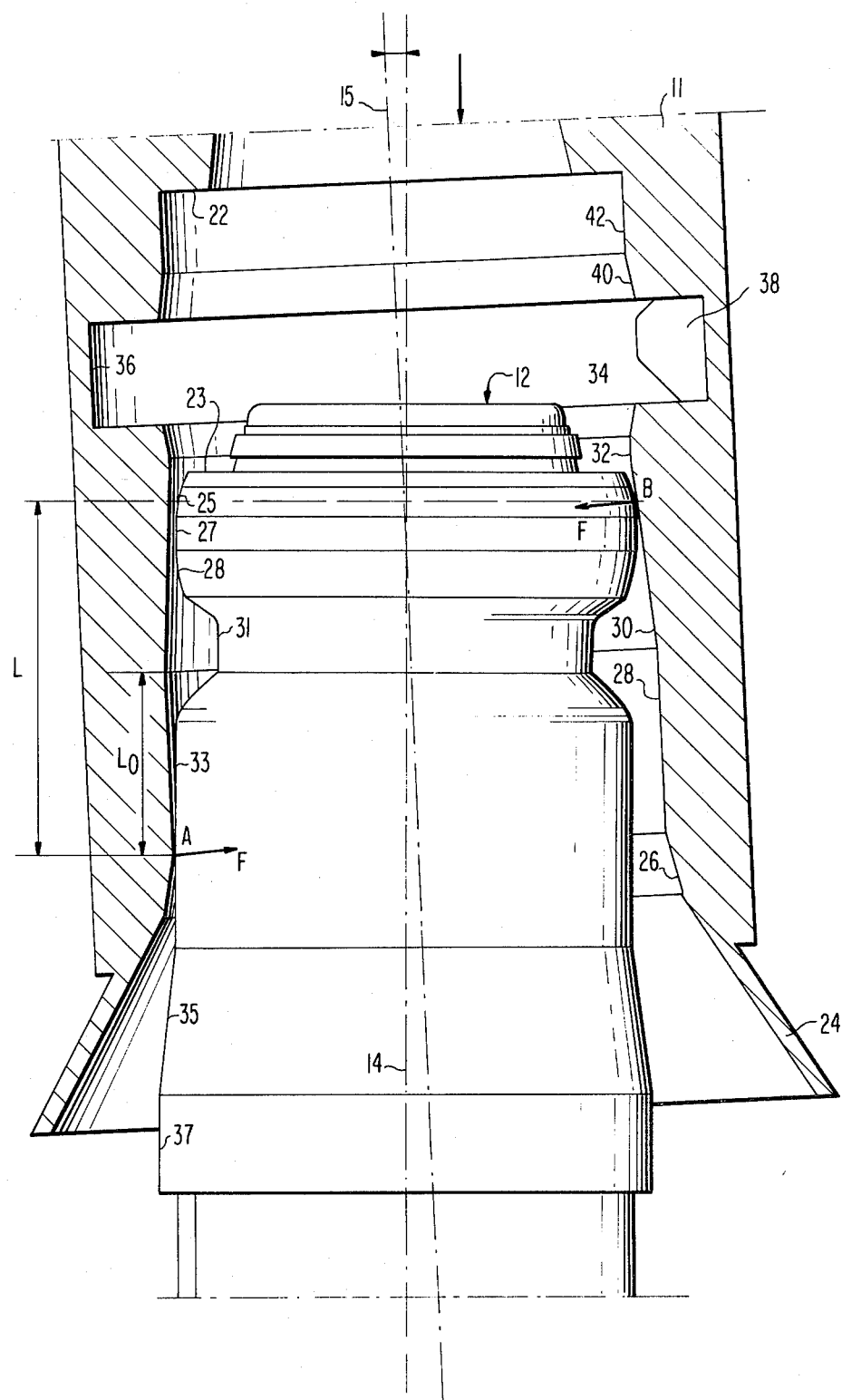

In order that the invention may be well understood there will now be described some embodiments thereof, given by way of examples only, reference being made to the accompanying drawings, in which:

FIG. 1 is a schematic representation, in elevation, of a coupling for simultaneously joining a valve manifold to a well head and a union to a collector, FIGS. 2 to 4 are schematic representations, in elevation, of the successive positions adopted by the coupling of FIG. 1 in operation, and FIG. 5 is the schematic representation of the ends of the union and of the collector during connection.

Since hydraulic connectors for coupling are known, a connector 3 associated with a valve manifold 2 for controlling the well 1 has been represented schematically. In the embodiment chosen, a structure 7 supports any receiving means 8 which serves fixedly to position a collector pipe 9 by means of a fixing piece 5. A rigid bracket 16 fast with the valve manifold 2, is joined to the end of a horizontal part of a pipe 10 by means of a stiffener 13 which is articulated at 17 on the bracket and at 18 on the pipe 10, whereby the depending part of the pipe is displaceable to a desired degree as will appear.

Means 4 of any suitable type connect the coupling pipe 10 to the valve manifold 2. Positioning devices for correctly orientating the manifold 2, so that end 11 of the pipe 10 and end 12 of the fixed collector pipe 9 are opposite one another, are known, do not form part of the invention and they will not be described. Despite the correct orientation of the manifold 2, axes 14 and 15 of the ends 12 and 11 of the collector pipe 9 and of the pipe 10 may be partically out of alignment. During this lowering, in the case where end 11 constitutes the actual connector of the pipe 10 to the end 12 of the collector pipe 9, the axes 14 and 15 of the ends 11 and 12 are realigned by a special combination of the surfaces of this male part 12 and this female part 11, shown in greater detail in FIG. 5.

These surfaces are such that they tend initially to reduce the distance between the axes 14 and 15 and then to bring them to coincidence by virtue, on the one hand, of the elasticity of the pipe 10, and, on the other hand, of the lateral stiffening due to the articulations 17 and 18 of the stiffener 13, as well as of the vertical stiffening obtained by the conjugated movement of the bracket 16 and the stiffener 13.

For this purpose, the connector 11 comprises, at its base, a first frusto-conical part 24, which serves to bring the axes 14 and 15 closer together. Above part 24 there is a frusto-conical coupling surface 26 leading to a cylindrical surface 28, the latter being followed by a frusto-conical coupling surface 30. The respective heights of the surfaces 28 and 30 are chosen to cooperate, respectively, with a cylindrical surface 33 and a frusto-conical coupling surface 25 of the end 12, so as to gradually reduce any discrepancy between the direction of the axes 14 and 15, as can be seen by examining the reactions produced at the points of contact A and B, which generate a torque reducing the angle between these axes. After the axes 14 and 15 have coincided, and the ends are fully engaged bearing surface 22 of the end 11 cooperates with the surface 23 of the end 12.

It will be noticed that the angles of the frusto-conical coupling surfaces are slight so as to reduce the bending forces in the pipe 10 during the alignment of the axes. Moreover, because of the profiles given to the coupling surfaces such as 25, there is no edge which can damage the surfaces in contact. Likewise, the coupling surface 26 of the end 11 cooperates with a frusto-conical surface 35, of the end 12 so as to position cylindrical surface 37 within the surface 28. Furthermore, at the upper region of the end 12, cylindrical surfaces 27 and 42 cooperate to effect, together with the surfaces 22 and 23, a positioning of the surfaces 31 and 36 in order to position locking fingers represented schematically by 38. Coupling profiles 32, 34 and 40 of the end 11, and also profiles 25 and 29 and the coupling surface 33 are similarly chosen in order to facilitate the passage of the ends 11 and 12 from the approach position to the final locking position. It then suffices to choose similar movements for coupling the manifold 2 to the well head 1 by means of the connector 3 and for coupling the pipe 10 to the collector 9 by means of the connector 11, giving the same vertical direction to the parts to be coupled, in order to carry out these conections or disconnections by simply lowering or raising the manifold 2.

In this way, leaktight couplings are produced despite the initial discrepancies between the axes 14 and 15.

Experience shows that since these discrepancies can be quite large, and to increase the displaceability of the pipe 10, the pipe may be formed to a helix.

In the embodiment shown in FIGS. 2 to 4, a pipe 20 formed to a helix is used to facilitate the joining of the ends 11 and 12 of the connector, end 11 being fixed to the pipe 20 and the end 12 being fixed to a collector pipe 19 fixed to a structure 21 by any suitable means indicated at 45. A valve manifold 52, associated with a hydraulic connector 53, has been shown in a position where it is connected to the top of the column of the well 1. The coupling pipe 20 is coupled to manifold 52 by means of a union 44, and a rigid strengthening piece 46 fast with the manifold acts in the same way as the bracket 16 in FIG. 1. Spaced points on the helix formed by the pipe 20 each carry an articulation, shown at 47 and 48, the articulations being connected respectively to a rod 51 of a jack 50 and to an end 54 of a body of the jack. The articulation 48 can form part of a support 39 fast with the pipe 20, and the articulation 47 can be mounted on spindle 49 of a yoke 55.

As shown in FIG. 2 the valve manifold 52 has been lowered and connected to the top of the column of the well 1, but the end 11 of the coupling pipe 20 and the end 12 of the collector 19 are separated from one another. When it is desired to connect the ends 11 and 12, the jack 50 is operated by means of conventional circuits, which are not shown in order to preserve the clarity of the drawing, and this extends the jack 50 and FIG. 3 shows the situation at the moment when the centering of the end 11 begins to take place as the end 12 partially penetrates into the cylindrical part 28 of the end 11. As soon as this stage has been reached, the operation of extending the jack 50 can be continued to the situation shown in FIG. 4. With rod 51 bearing on the articulation 47 fast with the rigid strengthening piece 46, and end 54 of the body of the jack 50 bearing on articulation 48, the end 11 is urged on to the end 12, with the result that the contacts A and B of their surfaces align the axes 14 and 15 of this connector, as previously described. During this alignment, the jack 50 pivots about the articulations 47 and 48, whilst the point of attachment of articulation 48 to the helix formed by the coupling pipe 20 moves away from the end of the strengthening piece 46. When the ends 11 and 12 of the connector have been joined in this way, the locking of the connector is operated by means of fingers such as fingers 38 shown in FIG. 5. Since these operations are conventional, they have not been shown and do not need to be described.

The coupling described can be applied not only to the coupling of a single pipe to a coupling pipe, but also to coupling of individual pipes or of multiple pipes which are grouped together and are then associated with a multiple connector.

It is not necessary that the axis of the end of the collector to be coupled should be parallel to the axis of the well. In fact, when the valve manifold 52 has been connected to the well head 1, it is possible to use a jack with a horizontal axis in order to connect a collector with an end whose axis is horizontal to a connector whose end has a horizontal axis, the connector being at the end of a helical coupling pipe, of which the helix axis is horizontal. The coupling operation is identical to that described with reference to the example given in FIGS. 2 to 4.

Thus, the embodiments described apply to all couplings of two tubes, and the end for linking to the semi-rigid coupling tube preferably has an axis which is vertical in the case where it is desired to disconnect by vertical withdrawal the manifold supporting the coupling pipe. However, in all cases and regardless of the orientation of the axis of the fixed pipe or collector, the use of any tool is avoided and systems of lowering and guiding by means of cables and guide-columns can be omitted which is especially important where the coupling is to be used at great depths. Furthermore this type of couping allows tools to be transferred by pumping, where the radii of curvature of the couplings are sufficiently large.

I claim:

1. A coupling apparatus for connecting a coupling pipe fixedly attached to a first structure to a second pipe means fixedly positioned in approximate prealignment with said coupling pipe and fixedly attached to a second structure, the coupling apparatus comprising: means to move said first and second structures relatively toward and away from one another;

an end of said coupling pipe remote from said first structure being displaceable;

support means for said coupling pipe in the region adjacent said first structure;

a first end part carried by said end of said coupling pipe remote from the first structure;

a second end part carried by the second pipe means;

one of said first and second end parts being a male member and the other being a female member, said male and female members engageable together to make a connection and having cooperating surfaces which cooperate to guide said first and second end parts if misaligned when offered to one another into alignment as said end parts engage;

relative movement of said first and second structures toward one another bringing said first and second end parts to a proximate relationship; and means provided to complete the engagement of the first end part and the second end part;

wherein said coupling pipe is curved and said means for completing the engagement of said end parts comprise a jack coupled between points spaced along the length of said coupling pipe between which points said coupling pipe is curved, said jack being operable upon completion of relative movement of said structures to move said first end part into engagement with said second end part by varying the configuration of said first and second end parts towards and away from one another.

2. A coupling according to claim 1 in which said coupling pipe is formed to a helix.

3. A coupling according to claim 1 in which said first structure is a valve manifold movable upward and downward to engage and disengage said second structure, said second structure being a well head the end part of the second structure being a collector.

4. A coupling according to claim 1 in which the direction of relative movement of said first and second structures is parallel to the direction of engagement of the end parts.

5. A coupling apparatus for connecting a coupling pipe fixedly attached to a first structure to a second pipe means fixedly positioned in approximate prealignment with said coupling pipe and fixedly attached to a second structure, the coupling apparatus comprising: means to move said first and second structures relatively toward and away from one another;

an end of said coupling pipe remote from said first structure being displaceable;

support means for said coupling pipe in the region adjacent said first structure;

a first end part carried by said end of said coupling pipe remote from the first structure;

a second end part carried by the second pipe means;

one of said first and second end parts being a male member and the other being a female member, said male and female members engageable together to make a connection and having cooperating surfaces which cooperate to guide said first and second end parts if misaligned when offered to one another into alignment as said end parts engage;

relative movement of said first and second structures toward one another bringing said first and second end parts to a proximate relationship;

a rigid element carried by said first structure; and means provided to complete the engagement of said first and second end parts comprising an expansible stiffener extending between said rigid element and said coupling pipe at a point spaced from the connection of said coupling pipe to said first structure, said expansible stiffener facilitating the movement of said first and second end parts toward each other to cause said end parts to come into engagement.

6. A coupling according to claim 5 in which said expansible stiffener is a jack.

* * * * *